Patented June 7, 1949

2,472,426

UNITED STATES PATENT OFFICE 2,472,426

PROCESS OF ENRICHING THE ENDOSPERM OF CEREAL GRAINS WITH NATURAL VITAMINS

Erich Gustav Huzenlaub, Brentford, England, assignor to Mars and Huzenlaub, Chicago, Ill., a copartnership No Drawing. Application November 12, 1946, Serial No. 709,093

6 Claims. (Cl. 99—11)

My invention relates to a process of enriching the endosperm of cereal grains with natural vitamins. The present application is in part a continuation of my prior application Serial No. 500,561, now abandoned, filed August 30, 1943.

In my U. S. Patent No. 2,287,737, issued June 23, 1942, I have disclosed a process for enriching grains with natural vitamins by subjecting the grains to vacuum and thereafter steeping the grains under certain temperature and pressure conditions to cause the natural vitamins in the husk and germ of the grain to be imparted to the endosperm. Under some conditions it is desirable to increase the vitamin content of the steeping liquid by introducing thereinto a material such as bran which is rich in natural vitamins of the B complex. The vitamin-rich material may be placed in the steeping vessel along with the grain to be treated or may be introduced into the steeping liquid before this liquid is pumped into the steeping vessel, as in either instance the steeping liquid will dissolve the natural vitamins out of such material.

I have discovered that superior results are obtained if the bran utilized as a source material for natural vitamins is derived from a different kind of cereal than that of the cereal grains being treated in the steeping vessel. For example, if a first batch of wheat grains is steeped in a liquid containing a given total vitamin $B_1$ content derived from wheat bran and a second batch of wheat grains is steeped in a liquid containing the same total $B_1$ content derived from rice bran, and all other conditions are the same, the endosperm of the grains of the batch steeped in the liquid containing the vitamin derived from rice bran will have a higher vitamin $B_1$ content than the endosperm of the grains of the other batch.

If, in the foregoing example, rice grains are substituted for the wheat grains, the endosperm of the rice grains in the batch steeped in the liquid containing the vitamins derived from wheat bran will be richer in such natural vitamins than the endosperm of the grains of the batch steeped in liquid containing the vitamins derived from rice bran. Similar results can be obtained with other kinds of cereal grains and/or other kinds of bran. While I have referred to the steeping liquid as containing a particular kind of bran, it is only essential that the steeping liquid contain the vitamins dissolved out of such bran as the bran itself may be removed or separated from the steeping water prior to the steeping operation.

The results shown by the following tests are typical of those obtainable from the use of my invention and are cited herein merely as specific examples illustrative of such results:

Test 1

Five kilograms of whole wheat berries, containing 13 per cent of moisture and 1.6 International Units (I. U.) of vitamin $B_1$ per gram, were steeped for 30 minutes in 8 liters of an aqueous extract of wheat pollards; said extract containing 3 I. U. of vitamin $B_1$ per cc. The steeped wheat, after being dried to its original moisture content of 13 per cent, was found to contain 1.8 I. U. of vitamin $B_1$ per gram, an increase of 0.2 I. U. per gram above the original content of 1.6 I. U.

Test 2

This test was repeated in all respects like Test 1, except that the aqueous extract (steeping liquid) was prepared from rice bran. This extract also contained 3 I. U. of vitamin $B_1$ per cc. The steeped wheat in Test 2, after being dried to its original moisture content of 13 per cent, was found to contain 2.1 I. U. of vitamin $B_1$ per gram—an increase of 0.5 I. U. per gram above the original content of 1.6 I. U.

Flour extracted (to 72 per cent extraction) from the steeped and dried whole wheat berries of Test 1 contained 0.45 I. U. of vitamin $B_1$ per gram. Flour similarly extracted from the steeped and dried whole wheat berries of Test 2 contained 1.1 I. U. per gram.

Test 3

Five kilograms of whole rice (paddy) of a moisture content of 13 per cent and with an original vitamin $B_1$ content of 1.0 I. U. per gram were steeped for 6 hours in 8 liters of an aqueous extract of rice bran; said extract containing 3 I. U of vitamin $B_1$ per cc. The steeped rice, after being dried to its original moisture content of 13 per cent, was found to contain 1.5 I. U. of vitamin $B_1$ per gram, an increase of 0.5 I. U. per gram above the original content of 1.0 I. U.

Test 4

This test was repeated in all respects like Test 3 except that the aqueous extract (steeping liquid) was prepared from wheat pollards. This extract also contained 3 I. U. of vitamin $B_1$ per cc. The steeped rice in Test 4, after being dried to its original moisture content of 13 per cent, was found to contain 1.75 I. U. of vitamin $B_1$ per gram, an increase of 0.75 I. U. per gram above the original content of 1.0 I. U.

All of the conditions of Tests 1 and 2, relating to the steeping of whole wheat berries, were kept the same except that in Test 1 the source of additional vitamin $B_1$ was wheat pollards (bran) whereas that source in Test 2 was rice bran.

All of the conditions of Tests 3 and 4, relating to the steeping of whole rice, were kept the same except that in Test 3 the source of additional vitamin $B_1$ was rice bran, whereas in Test 4 that source was wheat pollards.

My novel process is not limited to the use of bran, but may be practiced by draining the steeping liquid used to enrich a batch of grain of a given kind and using this liquid to enrich a batch of grain of a different kind.

The term bran, as used herein, is to be construed as including any other byproducts of milling which are suitable for carrying out the purposes of my invention.

I claim:

1. That process of enriching the endosperm of cereal grains with natural vitamins which comprises steeping the grains of one kind of cereal in a liquid containing a proportion of natural vitamins dissolved by it out of a different kind of cereal, whereby the steeped grains acquire a higher vitamin content than they do when steeped—all other conditions being the same—in a liquid containing an equal proportion of the same natural vitamins dissolved out of the same kind of cereal as that being steeped.

2. That process of enriching the endosperm of cereal grains with natural vitamins which comprises steeping grains of one kind of cereal in liquid which contains bran derived from a different kind of cereal together with a proportion, relative to the amount of liquid of natural vitamins dissolved by the liquid out of the bran, whereby the steeped grains acquire a higher vitamin content than they do when steeped, all other conditions being the same, in a liquid which contains bran derived from the same kind of cereal as that being steeped, together with an equal proportion of the same kinds of natural vitamins dissolved by the liquid out of the last-named bran.

3. That process of enriching the endosperm of grain with natural vitamins which comprises introducing into steeping liquid capable of dissolving such vitamins bran obtained from one kind of cereal, removing said bran from said liquid after said liquid has dissolved natural vitamins in said bran to form a proportion of said liquid, immersing grains of a different kind of cereal in said liquid, and steeping said grains in said liquid whereby to impart to the endosperm of said grains vitamins so dissolved from said bran, in an amount greater than that imparted to the steeped grains when—with all other conditions remaining the same—the bran so used is derived from the same kind of cereal as that being steeped, and the vitamins dissolved from the last-named bran form the same proportion of the steeping liquid.

4. That process of enriching the endosperm of grains of rice with natural vitamins which comprises steeping said grains in a liquid containing vitamins dissolved out of wheat, the dissolved vitamins forming a proportion of said liquid, whereby to impart vitamins to said rice grains in an amount greater than that imparted thereto when—with all other conditions remaining the same—said liquid contains vitamins in the same proportion but dissolved out of rice.

5. That process of enriching the endosperm of wheat grains with natural vitamins which comprises steeping the wheat grains in a liquid containing natural vitamins dissolved out of rice, the dissolved vitamins forming a proportion of said liquid, whereby to impart vitamins to said wheat grains in an amount greater than that imparted thereto when—with all other conditions remaining the same—said liquid contains vitamins in the same proportion but dissolved out of wheat.

6. That process of enriching the endosperm of cereal grains with natural vitamins which comprises steeping in liquid a batch of grains of one kind of cereal to enrich the endosperm of such grains, recovering such steeping liquid, containing a proportion, relative to said liquid, of natural vitamins dissolved out of the steeped grains, and steeping therein a second batch of grains of a different kind of cereal, whereby to enrich the endosperm of said last-named grain with natural vitamins in an amount greater than the enrichment of the endosperm therewith when—with all other conditions remaining the same—said second batch of grains being steeped in a recovered steeping liquid containing the same proportion of natural vitamins dissolved out of the steeped grains, as aforesaid, is of the same kind of cereal as that from which the steeping liquid has been recovered.

ERICH GUSTAV HUZENLAUB.

REFERENCES CITED

The following references are of record in the file of this patent:

UNITED STATES PATENTS

| Number | Name | Date |
| --- | --- | --- |
| 2,287,737 | Huzenlaub | June 23, 1942 |

FOREIGN PATENTS

| Number | Country | Date |
| --- | --- | --- |
| 544,360 | Great Britain | Apr. 9, 1942 |